United States Patent
Woehler

[19]

[11] Patent Number: 5,816,678

[45] Date of Patent: Oct. 6, 1998

[54] AIRPORT BEACON

[75] Inventor: Gary B. Woehler, Crosby, Minn.

[73] Assignee: Hali-Brite Incorporated, Crosby, Minn.

[21] Appl. No.: 899,013

[22] Filed: Jul. 23, 1997

Related U.S. Application Data

[63] Continuation of Ser. No. 751,367, Nov. 19, 1996, abandoned, which is a continuation of Ser. No. 388,806, Feb. 15, 1995, abandoned.

[51] Int. Cl.⁶ .................................................. F21V 21/30
[52] U.S. Cl. ......................... 362/35; 362/272; 362/286; 362/386
[58] Field of Search .................. 362/35, 153.1, 362/250, 272, 286, 386

[56] References Cited

U.S. PATENT DOCUMENTS

| | | | |
|---|---|---|---|
| 926,781 | 7/1909 | Townsend . | |
| 1,629,506 | 5/1927 | Jensen . | |
| 3,014,192 | 12/1961 | Leslie | 339/5 |
| 4,146,919 | 3/1979 | Jennings | 362/35 |
| 4,229,781 | 10/1980 | Hitora | 362/274 |
| 4,626,966 | 12/1986 | Bleiwas et al. | 362/35 |
| 4,717,991 | 1/1988 | Murphree, Jr. | 362/35 |
| 4,777,568 | 10/1988 | Solomon | 362/35 |
| 4,931,768 | 6/1990 | Jincks et al. | 340/473 |
| 4,970,627 | 11/1990 | Beaumont et al. | 362/35 |
| 5,047,901 | 9/1991 | Lin | 362/272 X |
| 5,339,224 | 8/1994 | Woehler | 362/35 |

*Primary Examiner*—Stephen F. Husar
*Attorney, Agent, or Firm*—Westman, Champlin & Kelly, P.A.

[57] ABSTRACT

An airport beacon for use with a source of electrical energy is provided. The airport beacon comprises a stationary housing, a rotatable assembly rotatably mounted to the stationary housing, and a motor rigidly attached to the stationary housing and connected to the rotatable assembly for rotating the rotatable assembly. A conductive liquid-filled rotary coupling is used to connect the source of electrical energy to the rotatable assembly. The rotatable assembly includes a lamp housing having first and second lamp holders and a ballast assembly. The ballast assembly includes a first ballast which electrically connects the conductive liquid-filled rotary coupling to the first lamp holder and a second ballast which electrically connects the conductive liquid-filled rotary coupling to the second lamp holder.

26 Claims, 2 Drawing Sheets

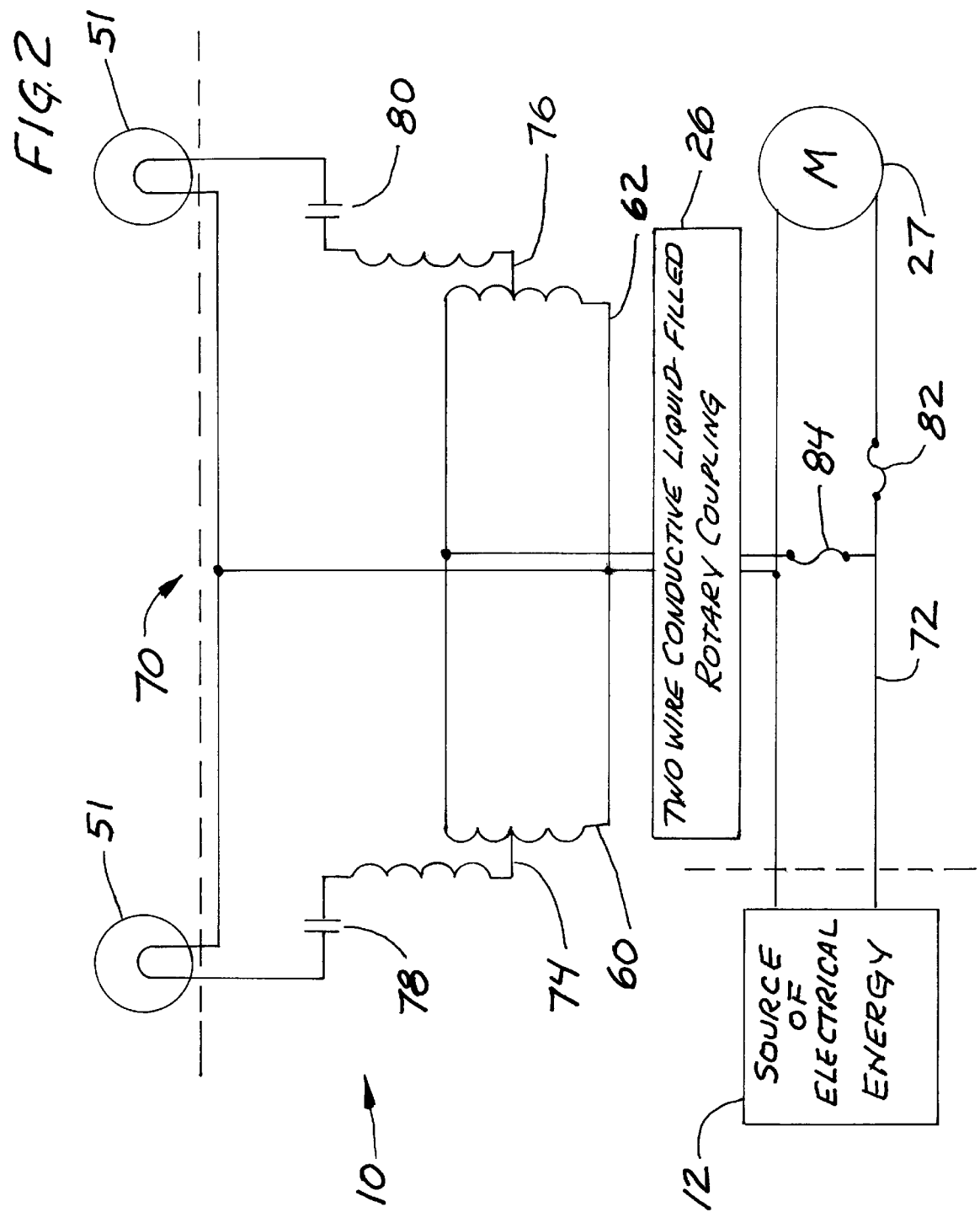

AIRPORT BEACON

This is a continuation of application Ser. No. 08/751,367, filed Nov. 19, 1996, now abandoned, which is a continuation of application Ser. No. 08/388,806, filed Feb. 15, 1995 now abandoned.

BACKGROUND OF THE INVENTION

The present invention relates in general to airport beacons which produce a light signal as a visual aid for airplane pilots.

Airport beacons produce and sweep a bright light through a complete 360° revolution as an aid to aerial navigation. Currently, however, there is much inconvenience and expense associated with the maintenance of such airport beacons. For example, airport beacons often use high powered incandescent lamps having a relatively short life. Many incandescent lamps have a life expectancy of only about 500 hours, which is approximately 42 days based on a 12 hour per day operation.

Also, in airport beacons having a rotatable lamp assembly, slip rings are used to carry power to the rotating lamp and other various components such as ballasts. Slip rings are a high maintenance component which must be cleaned regularly to remove carbon and possible grease and dirt build-up on the rings and brushes. Worn brushes and pitted slip rings cause many airport beacon failures.

Another high maintenance component of present airport beacons is the worm gear drive assembly used to rotate the lamp assembly. The worm gear drive assembly has a relatively short life and must be greased at least twice a year in order to maintain adequate performance.

Additionally, the lamps may be prevented from rotating for a number of reasons such as component failure or from ice and snow, or the like. When the lamps are prevented from rotating, the motor used to drive the lamps can suffer severe damage or burn-out. A clutch system is often used in such situations to prevent motor burn-out. Clutch systems fail from time to time and provide another source of maintenance problems.

SUMMARY OF THE INVENTION

The present invention is directed to an airport beacon for use with a source of electrical energy. The airport beacon comprises a stationary housing, a rotatable assembly rotatably mounted to the stationary housing, and a motor rigidly attached to the stationary housing and connected to the rotatable assembly for rotating the rotatable assembly. A conductive liquid-filled rotary coupling is used to connect the source of electrical energy to the rotatable assembly. The rotatable assembly includes a lamp housing having first and second lamp holders and a ballast assembly. The ballast assembly includes a first ballast which electrically connects the rotary coupling to the first lamp holder and a second ballast which electrically connects the rotary coupling to the second lamp holder.

BRIEF DESCRIPTION OF THE DRAWINGS

FIG. 2 is a diagrammatic schematic view of electrical components of the airport beacon of FIG. 1.

DETAILED DESCRIPTION OF THE PREFERRED EMBODIMENTS

Figure 1:
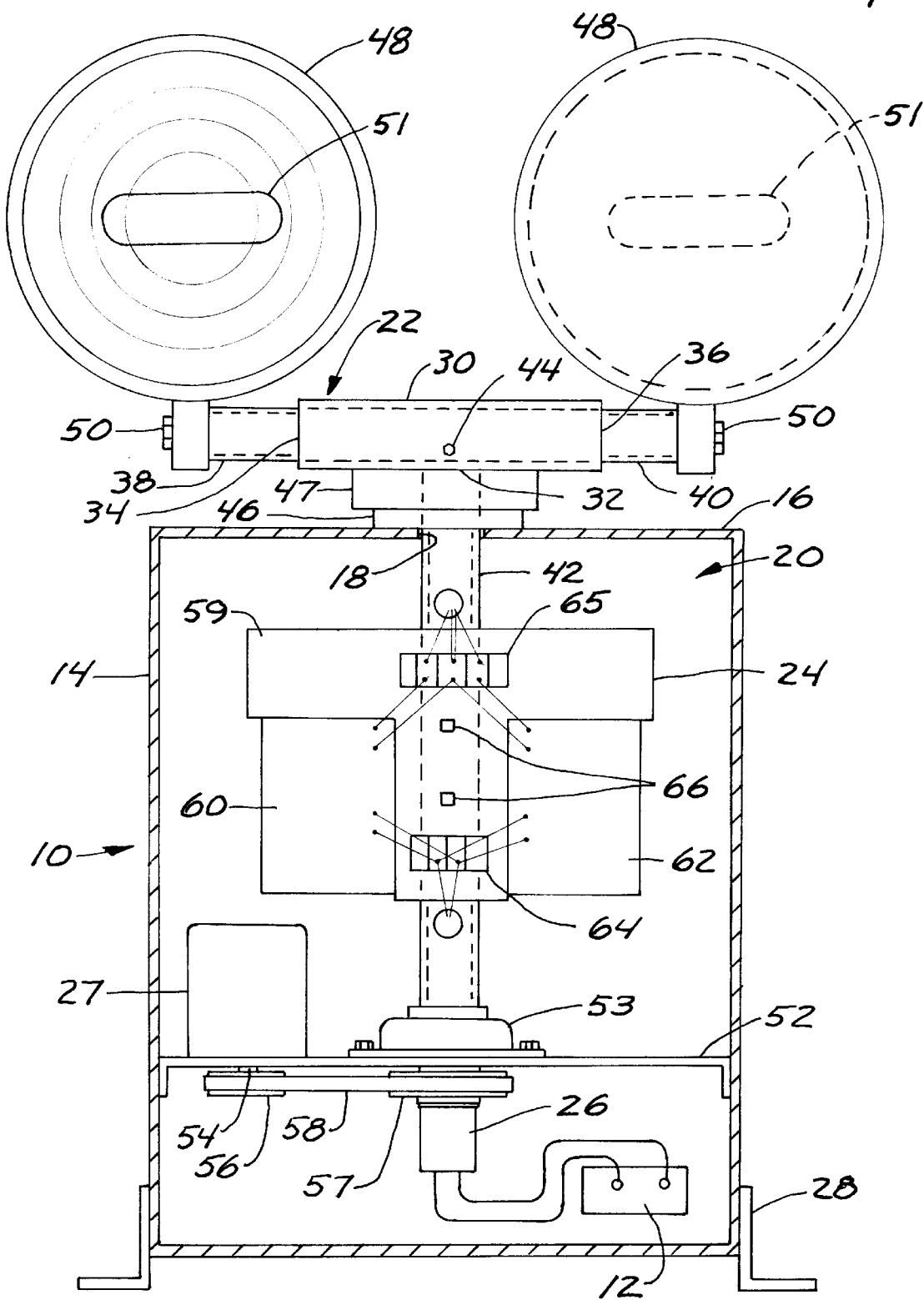
FIG. 1 is a cut-away schematic view of an airport beacon embodying features of the present invention.

An airport beacon 10 of the present invention is powered with a source 12 of electrical energy such as a typical alternating current source available at an airport to produce a bright, color coded signal as a visual aid for airplane pilots and the like. The airport beacon 10 is typically mounted on a beacon support tower (not shown) of any suitable construction.

The airport beacon 10 shown in FIG. 1 includes a stationary housing 14 having an upper surface 16 with an opening 18. Commonly, the stationary housing 14 is made from metal having one or more access doors (not shown) into the interior 20 thereof. A rotatable lamp mounting assembly 22 is rotatably mounted to the upper surface 16 and extends through the opening 18 into the interior 20. The rotatable lamp mounting assembly 22 is fixedly attached to a rotatable ballast assembly 24 disposed with-in the interior 20. A conductive liquid-filled rotary coupling 26 is used to transfer power from the power source 12 to the ballast assembly 24 instead of high maintenance slip rings used in prior art airport beacons. A drive motor 27 is used to rotate the ballast and lamp mounting assemblies 22, 24. The stationary housing 14 is fixedly mounted to the beacon support tower at support brackets 28 such that the airport beacon 10 produces rotating light beams or signals.

The lamp mounting assembly 22 includes a hollow hub center 30 having an opening 32 and two outlets 34, 36. The outlets 34, 36 are connected to outlet conduits 38, 40 by a weather-proof weld. An inlet conduit 42 is connected to hub opening 32 and secured in place by a locking screw 44. Inlet conduit 42 extends through the opening 18 into the interior 20 and is fixedly attached to the rotary coupling 26. An upper sealed bearing 46 is attached to the upper surface 16 and engages the inlet conduit 42. A weather cap 47, preferably made from a polymeric material, is used to secure the interior 20 from elements passing through the opening 18.

Lamp holders 48 are attached to the ends of outlet conduits 38, 40, mounted 180° apart, and held in place by locking bolts 50. The lamp holders 48 include a socket (not shown) suitable for holding a metal halide lamp 51 such as typical 175 watt units which each produce 7800 lumens of light with a two year life expectancy. Each lamp holder 48 also includes a parabolic reflector and associated optic system to provide a beam of light that can be seen for over 30 miles. The optic systems of the lamp holders 48 include color coding means for coding the color of light projected from at least one lens. Thus, one lens of the lamp holders 48 acts as a color coding lens and is constructed out of a green glass or transparent green thermal plastic to provide a green light. The opposite lens is typically clear although some beacons have more than two lamps for multi-colored signals.

The lamp holders 48 are normally adjusted to produce a light beam or signal at an optimum 4° above horizontal. This setting, however, can easily be readjusted to fit any particular situation by merely loosening the locking bolts 50, either lowering or raising the lamp holders 48 relative the outlet conduits 38, 40, and then retightening the locking bolts 50.

The stationary housing 14 further includes a support plate 52 fixedly attached thereto. A lower sealed bearing 53 is affixed to the support plate 52 and engages the inlet conduit 42. In the illustrated embodiment, the rotary coupling 26 is attached to the inlet conduit 42 beneath the support plate 52.

The drive motor 27 is also attached to the support plate 52. In the illustrated embodiment, the drive motor 27 includes a drive shaft 54 extending through the support plate 52. A gear 56 is attached to the end of the drive shaft 54. A cog belt 58 preferably couples the gear 56 to gear 57 which is connected to the inlet conduit 42 and the rotary coupling 26. The gears 56, 57 and cog belt 58 are low maintenance parts requiring no oil and have a longer life expectancy than the worm gear drive of many prior art airport beacons. Rotation of the drive shaft 54 thus rotates the lamp mounting assembly 22. Preferably, the lamp mounting 22 rotates at 12 RPM.

The drive motor 27 is preferably impedance protected. In other words, the drive motor 27 has a sufficient amount of windings to create energy dissipating resistance therein to prevent burn-out if the drive shaft is prevented from rotating. The impedance protected drive motor 27 has a longer life expectancy than prior art drive motors which often fail if the drive shaft is prevented from rotating. Furthermore, the impedance protected drive motor 27 eliminates the need for a clutch system that permits the rotation of the drive shaft when the lamps are prevented from rotating. Such clutch systems of prior art airport beacons fail from time to time and require regular maintenance. The impedance protected drive motor 27 greatly decreases the inconvenience and cost of maintaining prior art drive assemblies.

In the illustrated embodiment, the ballast assembly 24 includes a ballast plate 59 which is removably attached to the inlet conduit 42. The ballast assembly 24 includes two removable ballasts 60, 62 for providing sufficient current and voltage to power the lamps 51. The ballast plate includes electrical terminals 64, 65 to which the ballasts 60, 62 are electrically connected. The electrical terminals 64, 65 are electrically connected to the rotary coupling 26 and the lamp holders 48 at the lamp sockets, respectively. The electrical terminals 64, 65 provide a convenient means for removably connecting the ballasts 60, 62. The entire ballast assembly 24 may then be removed for easy replacement by removing bolts 66 which connect ballast assembly 24 to the inlet conduit 42.

The conductive liquid-filled rotary coupling 26 of the illustrated embodiment provides a two-wire connection from the electrical energy source 12 to the rotating inlet conduit 42 and ballast assembly 24 and eliminates the need for slip rings. The conductive liquid can include mercury. Additionally, a conductive liquid-metal which is liquid at the temperatures of operation, has been developed for use in such rotary couplings. Mercotac, Inc. of Carlsbad, Calif. manufactures such conductive liquid-filled rotary couplings as model number 230.

The rotary coupling 26 is far superior than the slip rings of prior art airport beacons. For example, the rotary coupling 26 is relatively maintenance free, permanently lubricated, and provides almost zero electrical resistance. In contrast, slip rings are a high maintenance component which must be cleaned regularly to remove carbon and possible grease and dirt build-up on the rings and brushes. Worn out brushes and pitted slip rings cause many beacon failures. Slip rings also provide an inefficient means for transferring power and are often characterized by arcing, and the like.

Referring to FIG. 2, the airport beacon 10 includes a circuit 70 for electrically coupling the lamps 51 and drive motor 27 to the source 12 of electrical energy. The circuit means 70 includes typically electrically conductive lead wires 72 extending between the lamps 51 and the source 12, and between the source 12 and the drive motor 27. The lead wires 72 pass through the rotary coupling 26 to ballasts 60, 62 such that slip rings are not needed. The two-wire connection rotary coupling 26 permits a relatively lower voltage thereacross and higher current therethrough as compared to a three-wire connection rotary coupling. This provides the benefit of a higher current capacity through the two-wire rotary coupling 26 and a lower open circuit voltage across the two-wire rotary coupling 26 if one or both of the lamps burns out.

The ballasts 60, 62 are electrically parallel to each other and include transformers 74, 76 to step up the voltage to the metal halide lamps 51. The ballasts 60, 62 also include capacitors 78, 80 to block direct current. The transformers 74, 76 and capacitors 78, 80 respectively may be constructed as a unit.

The circuit 70 is provided with a first fuse 82 for protecting the drive motor 27 and a second fuse 84 for protecting the lamps 51 and associated circuitry as shown in FIG. 2. Additionally, preferably all exposed electrical wires consist of "teflon" high temperature wire or are sleeved with heat resisting sleeves and any manner now apparent to those skilled in the art.

The airport beacon of the present invention provides many advantages. Among these, in addition to those disclosed above, is to provide a lower maintenance airport beacon as compared to the prior art. Airport beacons, for many years, have been high maintenance, low efficiency devices. The metal halide lamps 51 each consume 175 watts of power and the impedance protected motor 27 consumes an additional 50 watts of power. Prior art airport beacons using incandescent lamps typically consume a 2200 watts of power or more. Additionally, the rotary coupling provides an efficient means for transferring energy to the rotating lamps not provided with slip rings.

The sealed bearings 46, 53, impedance protected motor 27, and cog belt 58 are provided with permanent lubrication eliminating the need for grease and providing smooth, quiet and reliable operation. Furthermore, the construction of the airport beacon 10 eliminates the need for winterization packages necessary for many prior art airport beacons used in cold weather climates. The airport beacon of the present invention can operate in a temperature range of −55° C. to 55° C. In addition, the airport beacon 10 can operate in conditions of 0 to 100 percent humidity and sustain wind velocities of up to 100 miles per hour.

Although the present invention has been described with reference to preferred embodiments, workers skilled in the art will recognize that changes may be made in form and detail without departing from the spirit and scope of the invention.

What is claimed is:

1. An airport beacon for use with a source of electrical energy, the airport beacon comprising:
   a stationary housing having an opening;
   a rotatable lamp-holder assembly extending through the opening and rotatably coupled to the stationary housing;
   a two-wire conductive liquid-filled rotary coupling electrically connected to the source of electrical energy;
   a rotatable ballast assembly electrically connecting the rotatable lamp-holder assembly to the two-wire conductive liquid-filled rotary coupling; and
   an impedance protected motor for rotating the two-wire conductive liquid-filled rotary coupling.

2. The airport beacon of claim 1 wherein the impedance protected motor includes a drive shaft and a timing belt connecting the drive shaft to the two-wire conductive liquid-filled rotary coupling.

3. The airport beacon of claim 1 wherein the rotatable lamp-holder assembly includes first and second lamp holders.

4. The airport beacon of claim 3 wherein the rotatable ballast assembly comprises:
   a first ballast which electrically connects the two-wire conductive liquid-filled rotary coupling to the first lamp holder; and a second ballast which electrically connects the two-wire conductive liquid-filled rotary coupling to the second lamp holder such that the first ballast is electrically parallel to the second ballast.

5. The airport beacon of claim 4 wherein the first and second ballasts each comprise a transformer and a capacitor.

6. An airport beacon for use with a source of electrical energy, the airport beacon comprising:

a stationary housing;

a rotatable assembly rotatably mounted to the stationary housing, the rotatably assembly including:

a lamp-holder assembly having first and second lamp holders;

a conductive liquid-filled rotary coupling electrically connected to the source of electrical energy; and a ballast assembly having a first ballast which electrically connects the conductive liquid-filled rotary coupling to the first lamp holder and a second ballast which electrically connects the conductive liquid-filled rotary coupling to the second lamp holder; and a motor rigidly attached to the stationary housing and connected to the rotatable assembly for rotating the rotatable assembly.

7. The airport beacon of claim 6 wherein the stationary housing comprises a bearing engaging the rotatable assembly.

8. The airport beacon of claim 6 and further comprising a timing belt engaging the motor and the rotatable assembly.

9. The airport beacon of claim 8 wherein the motor is an impedance protected motor.

10. The airport beacon of claim 6 and further comprising a first lamp electrically connected to the first lamp holder and a second lamp electrically connected to the second lamp holder.

11. The airport beacon of claim 10 wherein the first and second lamps are metal halide lamps.

12. The airport beacon of claim 6 wherein the first ballast is electrically parallel to the second ballast.

13. An airport beacon for use with a source of electrical energy, the airport beacon comprising:

a stationary housing; and a rotatable assembly having a lamp holder and a conductive liquid-filled rotary coupling which electrically connects the source of electrical energy to the lamp holder.

14. The airport beacon of claim 13 wherein the rotatable assembly further comprises a first ballast electrically connecting the conductive liquid-filled rotary coupling to the lamp holder.

15. The airport beacon of claim 14 wherein the first ballast comprises a transformer and capacitor in electrical series with the lamp holder.

16. The airport beacon of claim 14 and further comprising a lamp electrically connected to the lamp holder.

17. The airport beacon of claim 16 wherein the lamp is a metal halide lamp.

18. The airport beacon of claim 14 wherein the rotatable assembly further comprises a second lamp holder and a second ballast electrically connecting the second lamp holder to the conductive liquid-filled rotary coupling wherein the second ballast is electrically parallel to the first ballast.

19. The airport beacon of claim 18 and further comprising a first lamp electrically connected to the first lamp holder and a second lamp electrically connected to the second lamp holder.

20. The airport beacon of claim 13 and further comprising a motor rigidly attached to the stationary housing and operably engaging the rotatable assembly.

21. The airport beacon of claim 13 wherein the conductive liquid is one of mercury and a liquid metal.

22. An airport beacon for use with a source of electrical energy, the airport beacon comprising:

a rotatable assembly having a lamp holder; and a impedance protected motor operably coupled to the rotatable assembly and electrically connected to the source of energy.

23. The airport beacon of claim 22 and further comprising a timing belt engaging the impedance protected motor and the rotatable assembly.

24. The airport beacon of claim 23 and further comprising:

a stationary housing; and at least one bearing assembly attached to the stationary housing and engaging the rotatable assembly.

25. The airport beacon of claim 24 wherein the rotatable assembly further comprises a conductive liquid-filled rotary coupling which electrically connects the source of electrical energy to the lamp holder.

26. The airport beacon of claim 23 wherein the rotatable assembly comprises at least one ballast.

* * * * *